No. 706,014. Patented Aug. 5, 1902.
A. A. BRANDENBURG & W. C. KNOBELOCK.
COOKING VESSEL.
(Application filed Apr. 23, 1902.)
(No Model.)
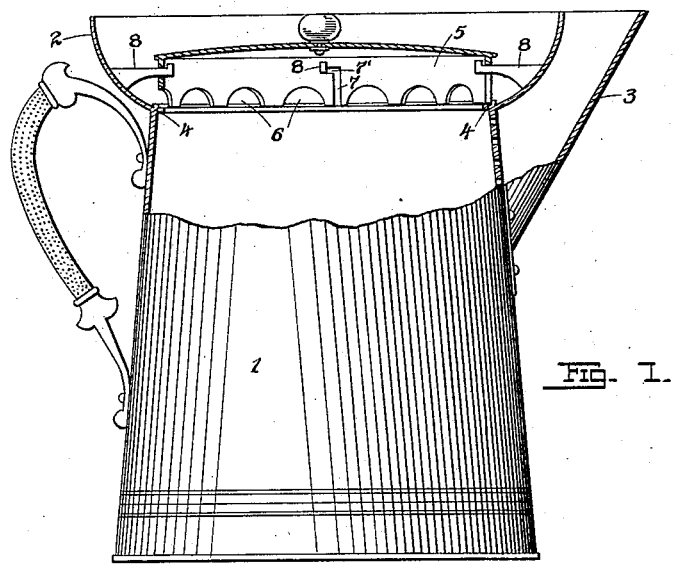
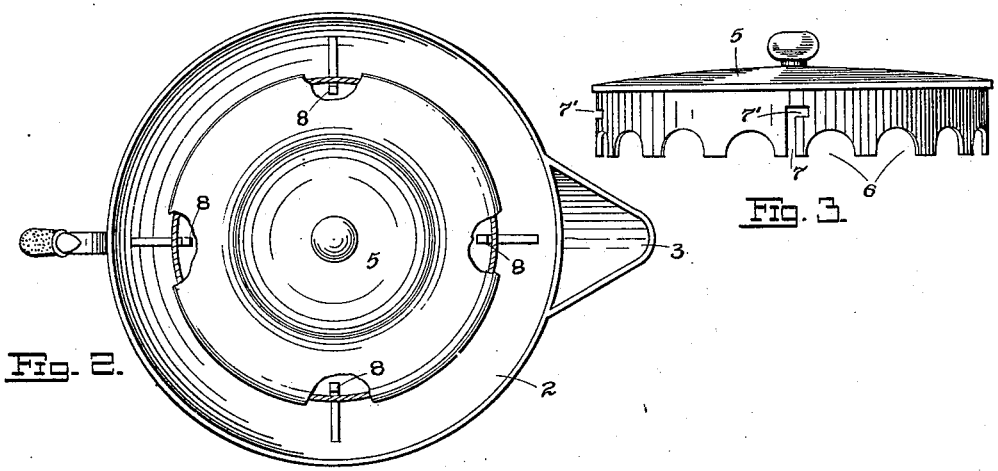
Witnesses
Inventors
Anthony A. Brandenburg
William C. Knobelock
By their Attorney

UNITED STATES PATENT OFFICE.

ANTHONY A. BRANDENBURG AND WILLIAM C. KNOBELOCK, OF ST. LOUIS, MISSOURI.

COOKING VESSEL.

SPECIFICATION forming part of Letters Patent No. 706,014, dated August 5, 1902.

Application filed April 23, 1902. Serial No. 104,373. (No model.)

*To all whom it may concern:*

Be it known that we, ANTHONY A. BRANDENBURG and WILLIAM C. KNOBELOCK, citizens of the United States, residing at St. Louis, State of Missouri, have invented certain new and useful Improvements in Cooking Vessels, of which the following is a full, clear, and exact description, reference being had to the accompanying drawings, forming a part hereof.

Our invention has relation to improvements in cooking vessels; and it consists in the novel arrangement and combination of parts more fully set forth in the specification and pointed out in the claims.

In the drawings, Figure 1 is a part elevation and middle vertical longitudinal section of one form of our vessel. Fig. 2 is a top plan thereof with parts broken away, and Fig. 3 is a detached view in elevation of the detachable cover.

The object of our invention is to construct a cooking vessel for domestic and commercial purposes in which provision shall be made for the ready escape of steam therefrom, and thus prevent the contents of said vessel from boiling over, as is generally the case with the prevailing forms of domestic cooking vessels.

In detail the invention may be described as follows:

Referring to the drawings, 1 represents the body portion of an ordinary form of coffeepot, in the present instance being provided with an upper outwardly-flaring concave rim 2, whose wall forms one of the walls of the spout 3, the spout and rim extending to the same height above the pot. At the base of the rim or wall 2 is formed an annular seat 4 for the support of the lower edge of a cover 5, the lower edge of the latter being scalloped, thereby leaving openings 6, distributed adjacent to said edge, for the free and uninterrupted escape of steam as fast as the same is generated within the pot. The peripheral walls of the cover 5 are provided with incisions or recesses 7 7', whose vertical members 7 are passed over a series of radially-disposed locking-arms 8, distributed along the inner surface of the rim 2, when the cover being given a slight turn or twist causes the arms to enter the horizontal members 7' of said recesses, the cover thereby becoming securely locked in position. With the cover in position, as shown, Fig. 1, there is formed between it and the rim 2 an annular basin, from which any liquid which is carried mechanically thereinto by the steam issuing through the opening 6 will gravitate back into the pot, and thus a minimum loss of liquid results, and boiling over is practically avoided.

It is of course apparent that we may alter the details herein shown without in any wise departing from the nature or spirit of our invention. So, too, is it obvious that we may use our principle not only on domestic cooking vessels, but may be applied for factory and general commercial purposes.

Having described our invention, what we claim is—

1. A cooking vessel having a body portion, an upper outwardly-flaring rim or wall, an annular seat at the base of the rim, a cover having scallops formed along the lower edge thereof adapted to rest on said seat, and means carried by the rim for locking the cover in position, substantially as set forth.

2. A cooking vessel having a body portion, an upper outwardly-flaring rim or wall, a spout having one of its walls formed by the wall of the rim, an annular seat at the base of the rim, a cover having scallops formed along the lower edge thereof adapted to rest on said seat, and means carried by the rim for locking the cover in position, substantially as set forth.

3. A cooking vessel having a body portion, an upper outwardly-flaring rim or wall, a spout, an annular cover adapted to rest within the rim, openings or perforations formed on the cover above the lower edge thereof, recesses having vertical and horizontal members cut in the peripheral wall of the cover, and locking-arms distributed along the inner surface of the rim for engaging said recesses and locking the cover in position, substantially as set forth.

4. A cooking vessel having a body portion, an upper outwardly-flaring rim or wall, an annular seat at the base of the rim, a cover having a series of openings formed adjacent to the lower edge thereof adapted to rest on said seat, and means carried by the rim above said seat for locking the cover in position, substantially as set forth.

In testimony whereof we affix our signatures in presence of two witnesses.

ANTHONY A. BRANDENBURG.
WILLIAM C. KNOBELOCK.

Witnesses:
EMIL STAREK,
G. L. BELFRY.